Sept. 22, 1964 J. E. FIELDEN 3,150,330

CONSTANT AMPLITUDE OSCILLATOR CIRCUIT

Filed Feb. 21, 1961 2 Sheets-Sheet 1

Sept. 22, 1964

J. E. FIELDEN 3,150,330

CONSTANT AMPLITUDE OSCILLATOR CIRCUIT

Filed Feb. 21, 1961

2 Sheets-Sheet 2

United States Patent Office 3,150,330

Patented Sept. 22, 1964

3,150,330

CONSTANT AMPLITUDE OSCILLATOR CIRCUIT

John Ernest Fielden, Altrincham, England, assignor to Fielden Electronics Limited, Manchester, England, a British company Filed Feb. 21, 1961, Ser. No. 90,790
Claims priority, application Great Britain Mar. 4, 1960
3 Claims. (Cl. 331—183)

This invention relates to electronic oscillators and has for its object the provision of an improved oscillator having an output oscillation which is stabilised in amplitude in accordance with a source of substantially constant potential.

According to the invention an electronic oscillator comprises an amplifier having an output including an oscillatory circuit, a load coupled to said oscillatory circuit, rectifier means having its input coupled to said load and providing in its output an output potential dependent upon the potential or current in said load, a source of substantially constant potential and switching means connected to said output of said rectifier means, said source and the input of said amplifier, said switching means being responsive to oscillations in said oscillatory circuit to supply to the input of said amplifier a train of pulses of the frequency of said oscillations, of an amplitude dependent upon the difference between said output potential and said substantially constant potential and of a phase such that the oscillations are maintained when said substantially constant potential is greater than said output potential.

Embodiments of the invention will now be described, by way of example, with reference to the accompanying drawing, of which:

Figures 1, 2:
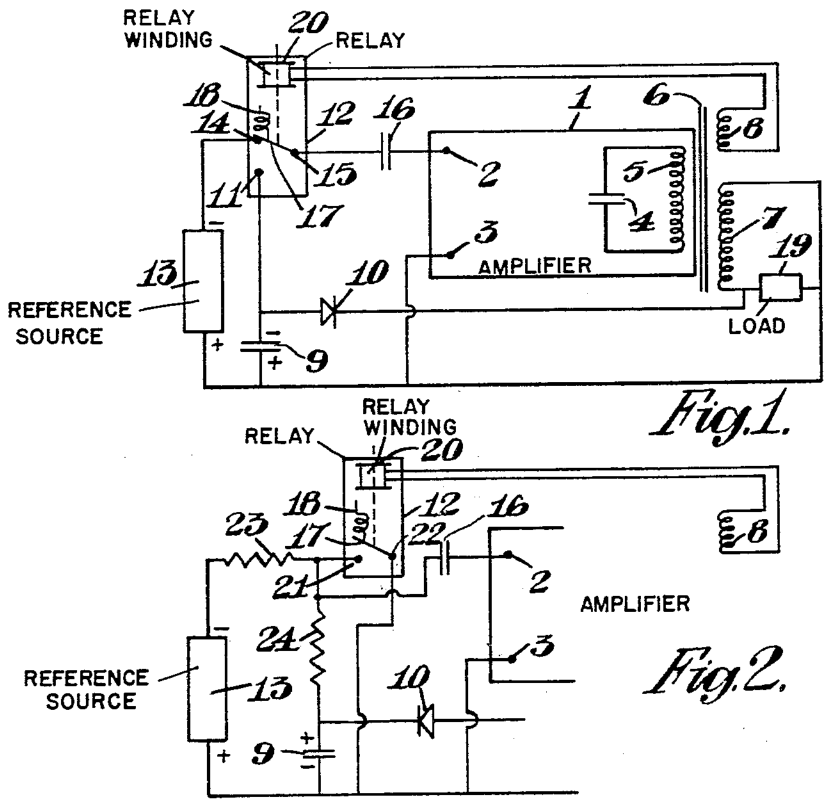
FIGURE 1 is a partly schematic circuit diagram of one embodiment.
FIGURE 2 is a partly schematic circuit diagram of a modification of part of the circuit of FIGURE 1.

In FIGURE 1, the reference numeral 1 indicates a multistage amplifier having input terminals 2, 3 and an output stage including an oscillatory circuit consisting of the capacitor 4 and inductor 5 connected in parallel. The inductor 5 forms the primary winding of a transformer 6 having secondary windings 7 and 8. Winding 7 has connected across it a load 19 and a series circuit consisting of a capacitor 9 and a rectifier 10. The common connection between winding 7 and capacitor 9 is connected to input terminal 3 of the amplifier 1. The common connection of the capacitor 9 and the rectifier 10 is connected to terminal 11 of a switching means 12. The rectifier 10 is so poled that terminal 11 becomes negative with respect to the common connection between winding 7 and capacitor 9 when oscillation occurs in the oscillatory circuit 4, 5.

A source 13 of substantially constant potential has its positive pole connected to the common connection of winding 7 and capacitor 9 and its negative pole connected to terminal 14 of the switching means 12.

Terminal 15 of the switching means 12 is connected via a capacitor 16 to the input terminal 2 of the amplifier 1.

In FIGURE 1 the switching means 12 is a biassed polarised relay having an energizing winding 20 connected across winding 8 and a contact arm 17 biassed by means of a spring 18, for example, to a normal position in which terminal 14 is connected to terminal 15. Terminal 14 is therefore connected to terminal 15 both when winding 20 is unenergized and when it is energized by a signal of a predetermined polarity such that the pull exerted on the arm 17 by winding 20 is in the same direction as the bias. The terminal 11 is connected to terminal 15 when winding 20 is energized by a signal of opposite polarity.

When power is first applied to amplifier 1 the initial surge causes oscillations to occur in the oscillatory circuit 4, 5 and a signal of a polarity opposite to the predetermined polarity is applied to winding 20 during either the first or second half cycle of these oscillations, causing contact arm 17 to move from its normal position to connect terminal 11 to terminal 15. When this occurs capacitor 9 is substantially uncharged, and capacitor 16 (which was charged to substantially the potential of source 13 while terminal 15 was connected to terminal 14) discharges to capacitor 9 via the input terminals 2, 3 of amplifier 1 thus causing a transient potential to be applied to terminals 2; 3 of a magnitude substantially equal to that of the source 13 and of a polarity corresponding to that of source 13. The occurrence of the transient voltage is as follows:

Whilst switch arm 17 connects terminal 15 to terminal 14, capacitor 16 is charged to potential of source 13 via input circuit 2 and 3 of amplifier 1. When terminal 15 is connected to terminal 11, capacitor 9 is substituted for source 13 and if the potential of capacitor 9 is small compared with source 13, as it is when the sequence is initiated, then capacitor 16 discharges through amplifier 1 input circuit 2 and 3 into capacitor 9. This discharge current through the amplifier input circuit causes the transient voltage. When the switch returns to contact 14 a current of opposite polarity passes due to capacitor 16 having previously discharged to a potential lower than source 13 and hence being recharged to source 13 potential. The arrangement is such that when this transient is applied to terminals 2, 3 the signal applied to winding 20 has the predetermined polarity. Consequently, the contact arm 17 is returned to its normal position. When this occurs capacitor 9 has acquired a small charge and, consequently, a further transient potential is applied to terminals 2, 3 of a magnitude somewhat less than that of the source 13 and of a polarity opposite to that of the transient applied immediately previously. This cycle of events is therefore continued and the switching means 12 is thus effective to supply to the terminals 2, 3 via the capacitor 16 a train of pulses having a frequency equal to that of the frequency of oscillation, an amplitude dependent upon the difference between the potential of the source 13 and the potential across the capacitor 9 and a phase appropriate to maintain oscillation.

As the magnitude of the potential across the capacitor 9 increases with the oscillatory potential across the load 19 this oscillatory potential will build up until the potential across the capacitor 9 approaches that of the source 13. The closeness with which the potential across the capacitor 9 approaches that of the source 13 increases with the gain of the amplifier 1 so that, provided this gain is sufficiently high, the potential across the capacitor 9 is maintained at a value almost equal to that of the source 13 and the oscillatory potential across the load 19 is maintained almost constant.

In the arrangement described above the potentials across the capacitance 9 and source 13 must be applied to terminals 3 and 15 in the same sense and it follows therefore, that if the source 13 is revised in polarity, as it may be, the polarity of rectifier 10 must be reversed also.

Figure 4:
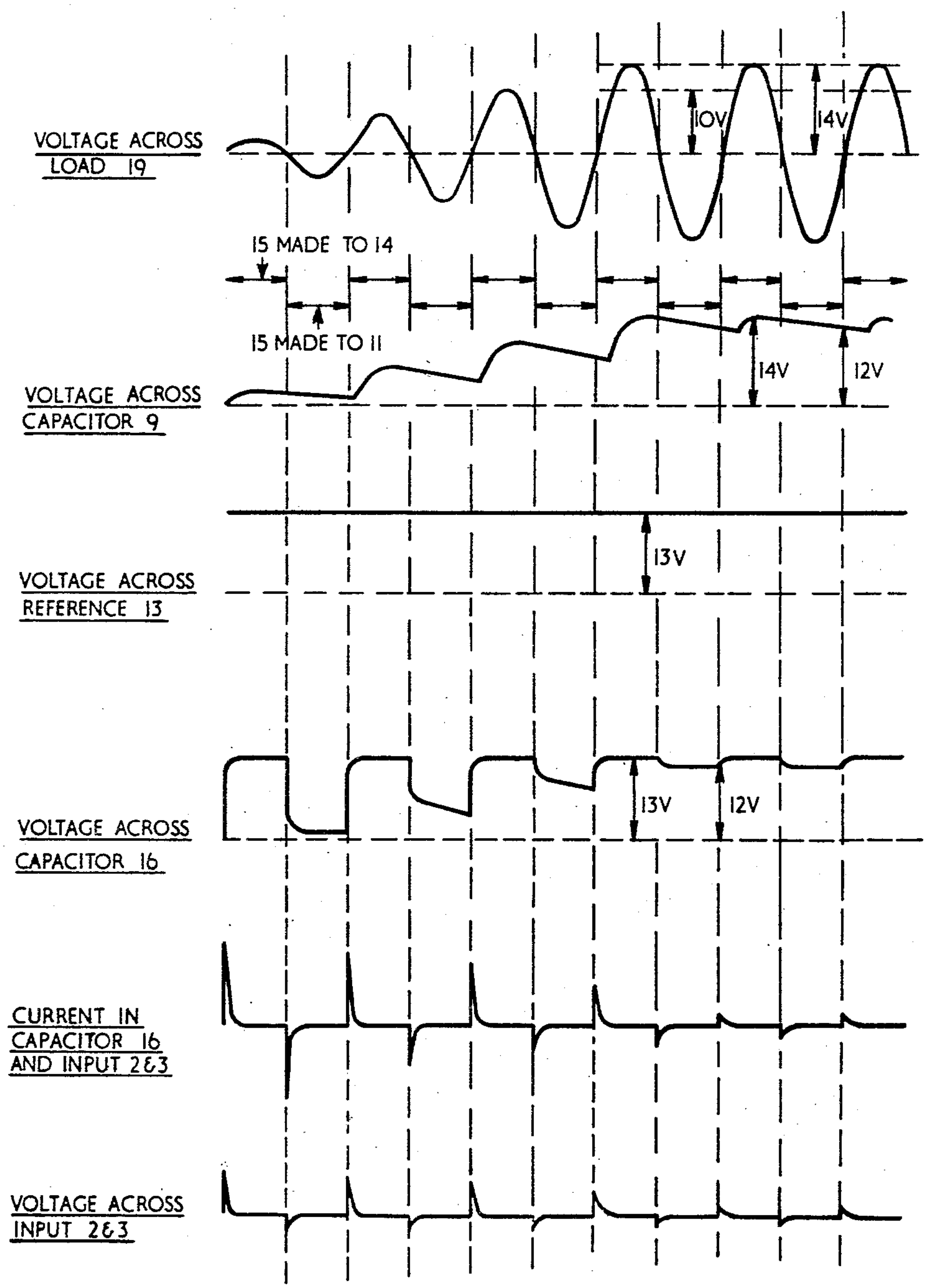
FIGURE 4 shows typical waveforms appearing at points indicated in FIGURE 1.

FIGURE 4 shows typical waveforms at points indicated in FIGURE 1. The invention is not limited to a particular magnitude but to show a relationship between the waveforms an amplitude of 10 units R.M.S. volts across the load 19 is assumed.

In the modified circuit shown in part in FIGURE 2 the switching means 12 is a biassed polarized relay having an energizing winding 20 connected across winding 8 and a contact arm 17 biassed by means of a spring 18, for example, to a normal position in which terminal 21 is disconnected from terminal 22. Terminals 21 and 22 are connected only when the signal applied to winding 20 is of a predetermined polarity. Terminal 21 is connected to the common connection of resistances 23 and 24 the other ends of which are respectively connected to the source 13 and capacitance 9. Capacitance 16 is connected between terminal 2 and terminal 21.

The polarity of rectifier 10 is such that when terminal 21 is disconnected from terminal 22 the transient applied to terminals 2, 3 is dependent upon the difference between the potentials of the source 13 and the potential developed across capacitance 9. When the terminal 21 is connected to terminal 22 the transient applied to terminals 2, 3 is zero.

It will be apparent that the switching means 12 is effective, as was the switching means of FIGURE 1 to supply to the terminals 2, 3 via the capacitance 16 a train of pulses having a frequency equal to the frequency of oscillations in the oscillatory circuit, an amplitude dependent upon the difference between the potential of the source 13 and the potential developed across capacitance 9 and a phase appropriate to maintain oscillation. The amplitude of oscillation therefore builds up to a value at which the potential of the source 13 is substantially equal to that developed across capacitance 9.

In the circuit of FIGURE 1 and in the modification of that circuit shown in part in FIGURE 2 the switching means 12 may be of any suitable kind. It may, for example, be a circuit of the kind known in the art as a chopper having no moving contact arm but effecting the switching action by entirely electronic means.

Figure 3:
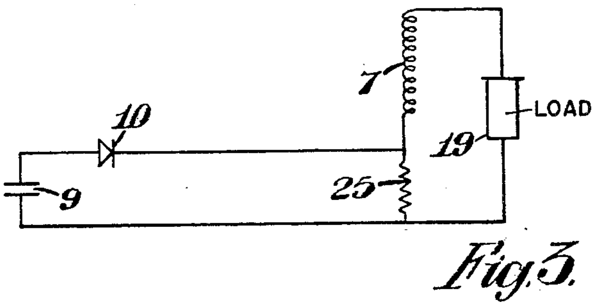
FIGURE 3 is a partly schematic circuit diagram of a modification of another part of the circuit of FIGURE 1.

In a further modification of the circuit of FIGURE 1, shown in part in FIGURE 3, the capacitance 9 and rectifier 10 are connected in series across a resistance 25 and the winding 7 and load 19 are also connected in series across resistance 25. The arrangement is then effective to maintain the oscillatory current in the load constant.

The modification of the circuit of FIGURE 1 which is shown in part in FIGURE 2 may also be modified as described above with reference to FIGURE 3 provided that the polarity of rectifier 10 is as shown in FIGURE 2.

What I claim is:

1. An electronic oscillator comprising an amplifier having an output including an oscillatory circuit, a load coupled to said oscillatory circuit, rectifier means having its input coupled to said oscillatory circuit and providing in its output an output potential dependent upon the potential or current in said load, switching means having operating means coupled to said oscillatory circuit so that said switching means is responsive to oscillations in said oscillatory circuit, said switching means being connected to said output of said rectifier means and to a source of substantially constant potential and to the input of said amplifier so that each operation of the switching means feeds to said amplifier a pulse of an amplitude dependent upon the difference between said output of said rectifier means and said substantially constant potential, the resultant train of pulses at the frequency of the said oscillation having a phase such that oscillations are maintained only when said substantially constant potential is greater than said output potential.

2. An oscillator according to claim 1 wherein said switching means connects a capacitor and the input of said amplifier in series across said source during alternate half cycles and across the output of said rectifier means during other half cycles, said source and the output of said rectifier means being similarly poled.

3. An oscillator according to claim 1, wherein said source and the output of said rectifier means are connected in series in the same sense across a pair of series connected resistances, a capacitor is connected between the common junction of said resistances and the input of said amplifier, said switching means during alternate half cycles of the oscillator, connecting the said common junction of the resistances to the common junction of said source and the output of said rectifier means.

References Cited in the file of this patent

UNITED STATES PATENTS 3,084,294 Vallese ---------------- Apr. 2, 1963